United States Patent
Murata et al.

(10) Patent No.: US 6,819,392 B2
(45) Date of Patent: Nov. 16, 2004

(54) METHOD FOR MANUFACTURING LIQUID CRYSTAL DISPLAY

(75) Inventors: Satoshi Murata, Kawasaki (JP); Hiroyuki Sugimura, Kawasaki (JP); Norimichi Nakayama, Kawasaki (JP); Hiroyasu Inoue, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 248 days.

(21) Appl. No.: 09/812,035

(22) Filed: Mar. 19, 2001

(65) Prior Publication Data

US 2001/0026348 A1 Oct. 4, 2001

(30) Foreign Application Priority Data

Mar. 29, 2000 (JP) ........................................ 2000-092195

(51) Int. Cl.[7] .......................... G02F 1/13; G02F 1/1339
(52) U.S. Cl. ...................................... 349/187; 349/190
(58) Field of Search .................................. 349/187, 190

(56) References Cited

U.S. PATENT DOCUMENTS

| | | | | |
|---|---|---|---|---|
| 4,983,429 A | * | 1/1991 | Takayanagi et al. | 428/1.53 |
| 5,106,441 A | * | 4/1992 | Brosig et al. | 156/104 |
| 5,263,888 A | * | 11/1993 | Ishihara et al. | 445/25 |
| 5,307,190 A | * | 4/1994 | Wakita et al. | 349/158 |
| 5,511,591 A | * | 4/1996 | Abe | 141/7 |
| 6,219,126 B1 | * | 4/2001 | Von Gutfeld | 349/153 |
| 6,238,754 B1 | * | 5/2001 | Shohara et al. | 428/1.5 |
| 6,359,667 B1 | * | 3/2002 | Koyanagi et al. | 349/55 |
| 6,377,328 B1 | * | 4/2002 | Morimoto et al. | 349/155 |
| 6,421,036 B1 | * | 7/2002 | Watanabe et al. | 345/87 |

* cited by examiner

*Primary Examiner*—Stacy A. Whitmore
*Assistant Examiner*—Jennifer M. Kennedy
(74) *Attorney, Agent, or Firm*—Greer, Burns & Crain, Ltd.

(57) ABSTRACT

The present invention relates to a method for manufacturing a liquid crystal display utilizing the dispense-injection method, and it is an object of the invention to provide a method for manufacturing a liquid crystal display which allows an optimum quantity of liquid crystals to be dispensed on each substrate. At a dispense-injection step, in the case of a two-shot process for fabricating two liquid crystal display panels from a single glass substrate, the heights of support posts on two CF substrates having columnar spacers formed thereon are measured at a plurality of points (e.g., five locations) on each of the surfaces using a laser displacement gauge and an average value of the height is obtained. The support post height of the columnar spacers is thus measured in advance to control the quantity of dispensed liquid crystals based on the measured value.

8 Claims, 9 Drawing Sheets

METHOD FOR MANUFACTURING LIQUID CRYSTAL DISPLAY

BACKGROUND OF THE INVENTION

1. Field of the Invention

The present invention relates to a method for manufacturing a liquid crystal display and, more particularly, to a method for manufacturing a liquid crystal display whose liquid crystal is sealed between two substrates using a dispense-injection process.

2. Description of the Related Art

Among liquid crystal displays, active matrix type color liquid crystal displays utilizing thin film transistors (TFTs) as switching elements are attracting attention as the mainstream of flat panel displays, and there is a need for a method for manufacturing them with high quality on a mass production basis.

General processes for manufacturing liquid crystal displays are an array process at which wiring patterns and switching elements such as thin film transistors are formed on glass substrates (in the case of the active matrix type), a cell process at which an alignment process is performed; spacers are provided; and liquid crystals are encapsulated between glass substrates opposite to each other and a module process at which driver ICs and a back-light are mounted.

The step of providing spacers at the cell process employs either a method in which a multiplicity of spherical particles in the form of beads are dispersed on the surface of the substrates or a method in which columnar spacers are formed on either or both of the glass substrates opposite to each other instead of the spherical particles. The spacers formed using such methods are used for maintaining a constant cell gap (cell thickness) between the glass substrates opposite to each other.

The step of injecting liquid crystals employs a method in which an array substrate having TFTs formed thereon and an opposite substrate having color filters (CFs) and so on formed thereon are combined in a face-to-face relationship using a sealing agent; the sealing agent is thereafter hardened; the liquid crystals and substrates are then put in a vacuum chamber; the atmospheric pressure is restored in the chamber after an injection port provided in the sealing agent is immersed in the liquid crystals to encapsulate the liquid crystals between the substrates (vacuum injection method).

Recently, the dispense-injection method is attracting attention in which a prescribed quantity of liquid crystals are dispensed on a surface of an array substrate within a frame of a main seal formed like a frame around the substrate and in which liquid crystals are filled by encapsulated them after the array substrate and an opposite substrate are combined in the vacuum. In comparison with the vacuum injection method used widely in manufacturing liquid crystal displays, the dispense-injection method can possibly reduce costs for manufacturing liquid crystal display panels and improve productivity on a mass production basis because, first, it can significantly reduce the amount of a liquid crystal material to be used and, second, it can decrease the time required for injecting liquid crystals, and a strong demand therefore exists for the use of the dispense-injection method at steps for manufacturing liquid crystal display panels.

According to the dispense-injection method, a predetermined quantity of liquid crystals are dispensed on a substrate using a liquid crystal dispenser. However, a problem can arise in that the quantity of liquid crystals encapsulated between two substrates to be combined can become excessive or insufficient because of the dispensing accuracy of the dispenser and variation of the cell gap. A shortage of the quantity of encapsulated liquid crystals results in so-called foams. Irregularity of display can occur when the quantity of encapsulated liquid crystals is excessive. Any panel having such foams and irregularity of display is regarded as defective.

According to the method of maintaining a cell gap using columnar spacers, support posts made of resin having a height of several microns are formed on substrates, and the height (thickness) of the support posts is likely to vary from substrate to substrate. When the height of the support posts significantly varies from substrate to substrate, a situation can occur in which a quantity of liquid crystals set to be dispensed for a certain substrate is excessive or insufficient for another substrate when the quantity is applied as it is. Even in the case of a multi-shot substrate that is a single glass substrate from which a plurality of liquid crystal display panels are formed, variation of the height of support posts can occur between regions in which display panels are to be formed. For this reason, the optimum quantity of liquid crystals to be dispensed can be different between the regions in which display panels are to be formed in the multi-shot glass substrate.

According to the method for maintaining a cell gap by dispersing beads, although spherical particles having substantially the same size are used, the quantity of dispensed liquid crystals can vary like the above-described case because the quantity of liquid crystals encapsulated between two substrates to be combined varies depending on the number of dispersed beads (dispersing density).

SUMMARY OF THE INVENTION

It is an object of the invention to provide a method for manufacturing a liquid crystal display that is a dispense-injection method in which liquid crystals can be dispensed in an optimum quantity on each substrate.

The above-described object is achieved by a method for manufacturing a liquid crystal display in which liquid crystals are injected by dispensing liquid crystals on a substrate and recovering the atmospheric pressure after combining the substrate with an opposite substrate in vacuum with the liquid crystal dispensing surface thereof facing the opposite substrate, characterized in that an optimum quantity of liquid crystals encapsulated between the two substrates to be combined is predicted based on the state of the substrate on which the liquid crystals are dispensed and in that the quantity of dispensed liquid crystals is controlled based on the predicted value.

According to the invention, in a method for manufacturing a liquid crystal display utilizing the dispense-injection method, the support post height of columnar spacers can be measured, and an optimum quantity of liquid crystals can be dispensed based on the measured value. When spherical particles are dispersed, the dispersing density can be measured to dispense an optimum quantity of liquid crystals based on the same. Therefore, the present invention makes it possible to dispense an optimum quantity of liquid crystals on each liquid crystal display panel and to thereby eliminate the so-called foams attributable to a shortage of the quantity of liquid crystals and display irregularity attributable to an excessive quantity of liquid crystals, which allows stable mass production.

DETAILED DESCRIPTION OF PREFERRED EMBODIMENTS

Figure 1A:
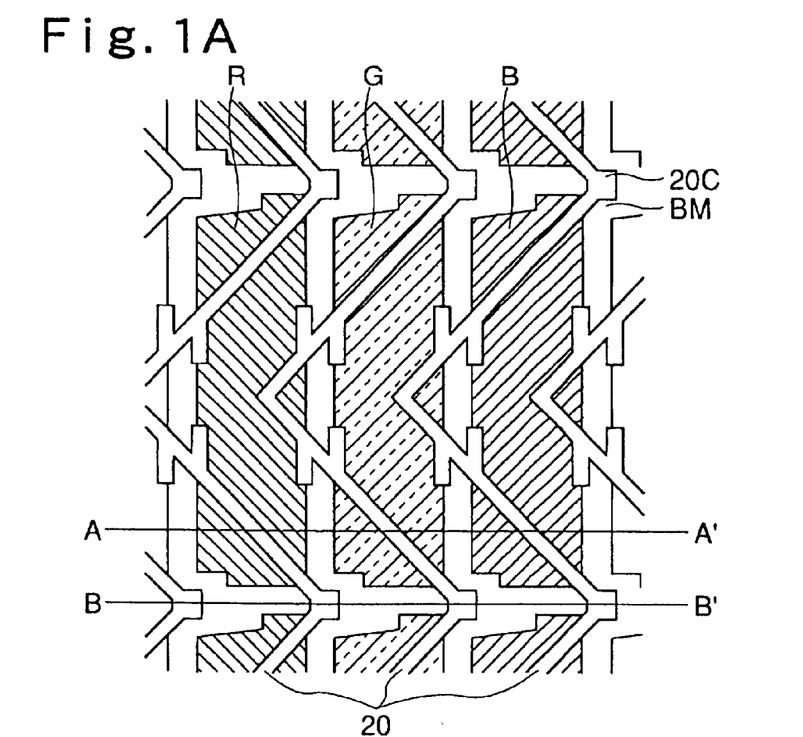
FIGS. 1A through 1C illustrate an example of a configuration of a CF substrate used in a method for manufacturing a liquid crystal display according to an embodiment of the invention.
Figure 1B:
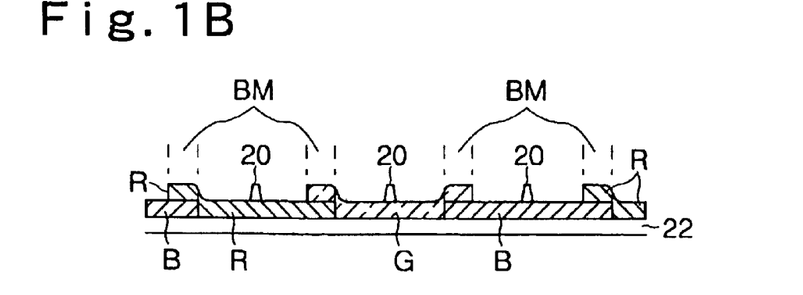
Figure 1C:
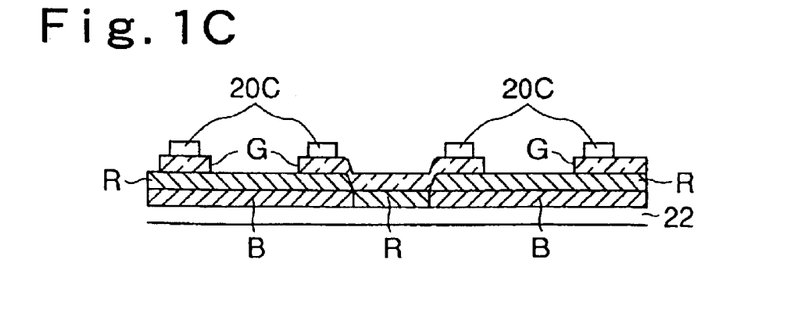

A method for manufacturing a liquid crystal display according to an embodiment of the invention will now be described with reference to FIGS. 1A through 11. FIGS. 1A through 1C illustrate an example of a configuration of a CF substrate used in the method for manufacturing a liquid crystal display according to the present embodiment and show a CF substrate used in an MVA (multi-domain vertical alignment) type liquid crystal display. The CF substrate is an example of a spacerless CF in which protruding structures are overlaid when a black matrix (BM) is formed using resin overlapping to provide support posts which also serve as spacers.

In FIG. 1A, the shaded regions are regions to serve as color filters where color resins R, G and B are respectively formed. The remaining region serves as a black matrix BM where the color resins overlap each other. Protrusions 20 and 20c are formed on the same. FIG. 1B is a cross section taken along the line A-A' in FIG. 1A. FIG. 1B indicates that the color resins R, G and B are formed on a glass substrate 22, and color resins in two colors are overlapped with each other in between pixels in the lateral direction to form a black matrix BM. FIG. 1C is a cross section taken along the line B-B' in FIG. 1A. While resins in two colors are overlapped with each other in regions other than lattice points to form a black matrix BM. At the lattice points, the color resins in three colors are overlapped with each other; the protrusions 20c which are part of the protrusion 20 are further overlapped; and such regions serve as columnar spacers (support posts).

Figure 2:
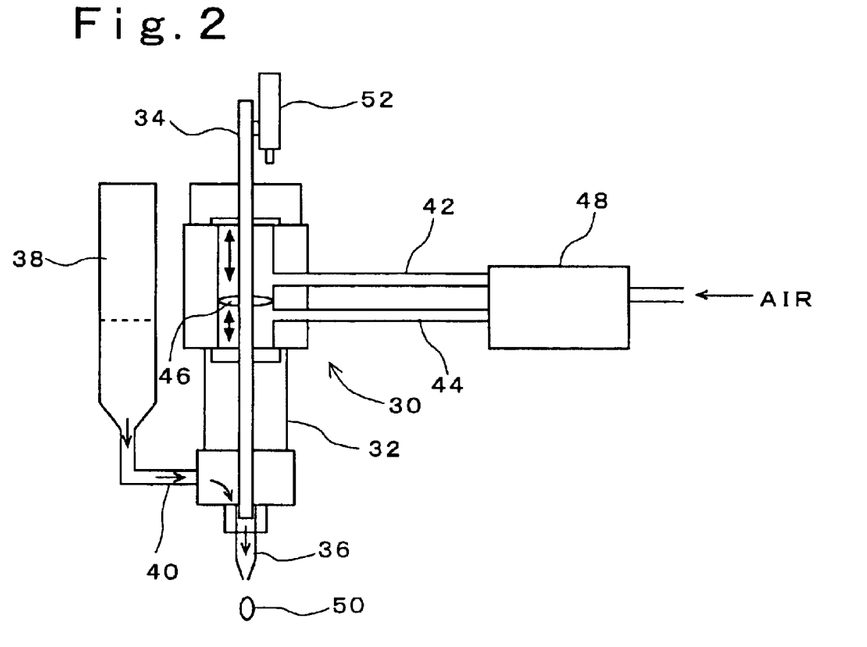
FIG. 2 is an illustration of a dispenser used in the method for manufacturing a liquid crystal display according to the embodiment of the invention.

A description will be made with reference to FIG. 2 on a schematic configuration of a plunger pump type dispenser used in the method for manufacturing a liquid crystal display according to the present embodiment. In FIG. 2, a dispenser 30 has a housing 32 in the form of a hollow cylinder and is adapted to be used with the central axis of the cylindrical configuration directed substantially in the vertical direction. A piston 34 in the form of an elongate rod is supported in the housing 32 along the central axis of the cylindrical configuration such that it can move in the vertical direction. The end of the piston 34 can move inside a nozzle 36 provided at the lower end of the housing 32 in the vertical direction. Liquid crystals in a liquid crystal container 38 can flow from an opening on a side wall of the housing 32 in the vicinity of the nozzle 36 to the nozzle 36 along the arrow in the figure through a supply pipe 40. Liquid crystals which have reached the interior of the nozzle 36 are dispensed from the nozzle 36 depending on the quantity of movement of the end of the piston 34 in the nozzle 36 and are not discharged from the nozzle 36 because of the surface tension of the liquid crystals themselves unless they are subjected to an external force.

Two in-flow ports 42 and 44 are provided at an interval from each other in the vertical direction on a side wall of an air chamber in the housing 32. A partition 46 for separating the air chamber into two parts are secured to the piston 34. The partition 46 can slide on the inner wall of the air chamber between the air in-flow ports 42 and 44 together with the piston 34. Therefore, the partition 46 moves downward under a vertical downward pressure when air flows into the air chamber through the air in-flow port 42, and moves upward under a vertical upward pressure when air flows into the air chamber through the air in-flow port 44. As a result, the piston 34 can be moved in a predetermined quantity in the vertical direction.

The air in-flow ports 42 and 44 are connected to a pump controller 48. The pump controller 48 takes air and feeds it to either of the air in-flow port 42 and 44 at predetermined timing.

The dispenser 30 having the above-described configuration dispenses 5 mg of liquid crystals 50 per shot. The quantity of dispensed liquid crystal per shot can be adjusted by controlling the quantity of movement of the piston 34 in the vertical direction using a micro-gauge 52 secured to a part of the piston 34 protruding above the housing 32.

Figure 3A:
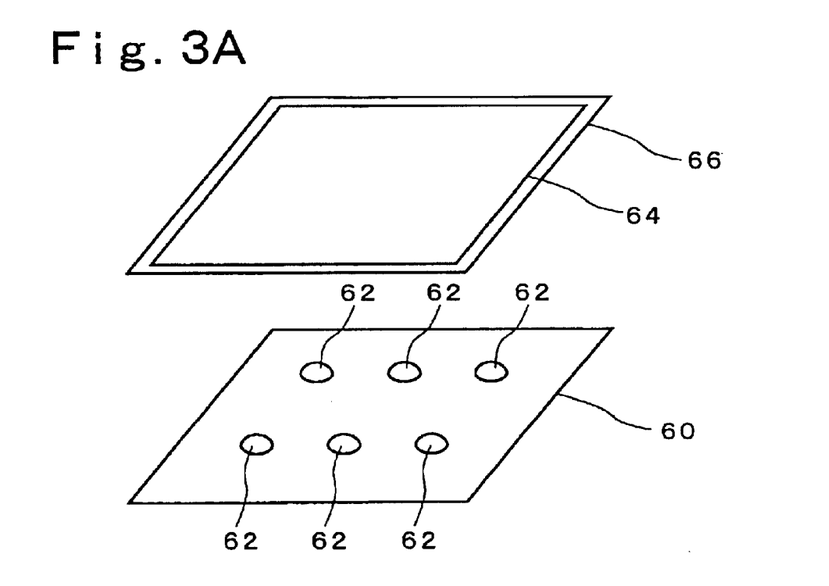
FIGS. 3A through 3C are illustrations of a dispense-injection method used in the method for manufacturing a liquid crystal display according to the embodiment of the invention.
Figure 3B:
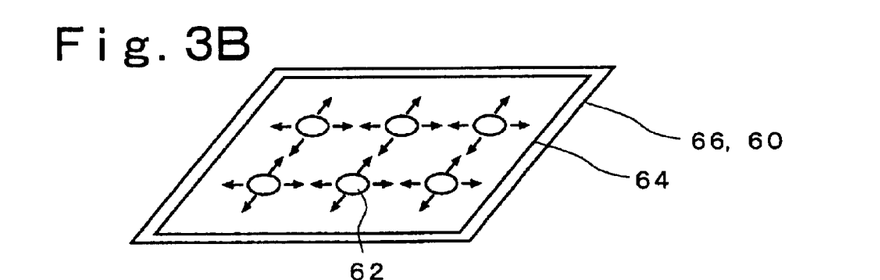
Figure 3C:
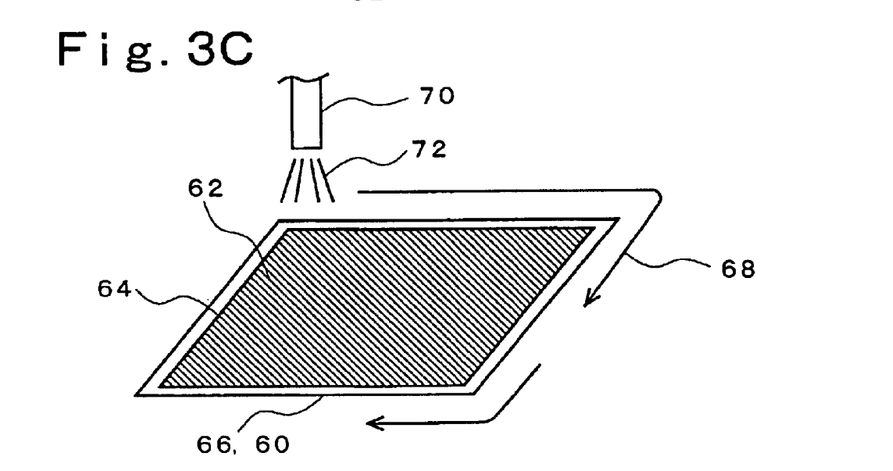

A schematic description will now be made with reference to FIGS. 3A through 3C on a dispense-injection method used in the method for manufacturing a liquid crystal display according to the present embodiment. As shown in FIG. 3A, liquid crystals 62 are first dropped from the dispenser 30 (not shown) onto a plurality of locations on a surface of an array substrate 60 having switching elements such as TFTs formed thereon. Next, a CF substrate 66 is aligned with and applied to the array substrate 60, the CF substrate 66 being an opposite substrate having a common electrode and color filters formed in a display area thereof and having a UV sealing agent 64 applied around the display area which is set when irradiated with ultraviolet (UV) rays. This step is carried out in vacuum. Next, when the combined substrates are returned into the atmosphere the liquid crystals 62 between the combined array substrate 60 and CF substrate 66 spread under the atmospheric pressure as shown in FIG. 3B. Then, as shown in FIG. 3C, UV light 72 is projected upon the sealing agent 64 by moving a UV light source 70 in a moving direction 68 along the region where the sealing agent 64 is applied (main seal) to set the sealing agent 64. This completes a liquid crystal display panel in which a cell gap (cell thickness) is maintained between the array substrate 60 and CF substrate 66 by a plurality of support posts 20c as shown in FIGS. 1A through 1C.

Figure 4:
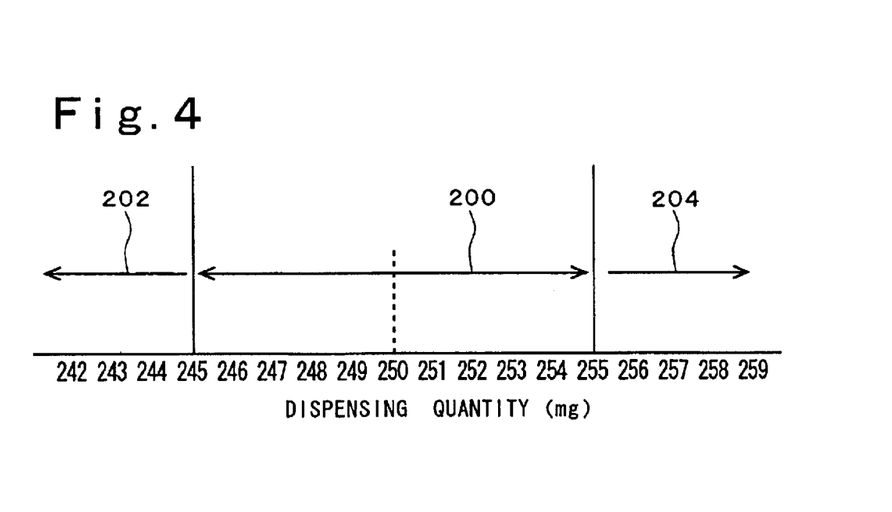
FIG. 4 is a graph showing a range of an optimum quantity of liquid crystals and a shortage and excess of the quantity of liquid crystals.

For example, the relationship between the cell gap and an optimum dispensing quantity is as shown in FIG. 4. FIG. 4 shows a liquid crystal display panel whose frame portion is 15 inches long in the diagonal direction thereof and whose cell thickness is 5 µm. The subsequent figures will also be described with reference to this liquid crystal display as an example. In FIG. 4, quantities (mg) of dispensed liquid crystals are shown on the abscissa axis to indicate a range of an optimum dispensing quantity and an excess and shortage of the quantity of liquid crystals, and it is apparent that the 250 mg shown substantially in the middle of the figure is an optimum dispensing quantity. A margin 200 for the dispensing quantity (a range of the optimum dispensing quantity) of the liquid crystal display panel is ±2.0% of the optimum dispensing quantity which is the range from 245 mg to 255 mg. The quantity of liquid crystals is insufficient in a range 202 in which the dispensing quantity is 245 mg or less, which results in so-called foams that produce a defective panel. In a range 204 where the dispensing quantity is in the excess of 255 mg, the redundant liquid crystals are pushed toward the peripheral frame region, which results in display irregularity attributable to an increase in the cell thickness at the frame region to produce a defective panel.

Figure 5:
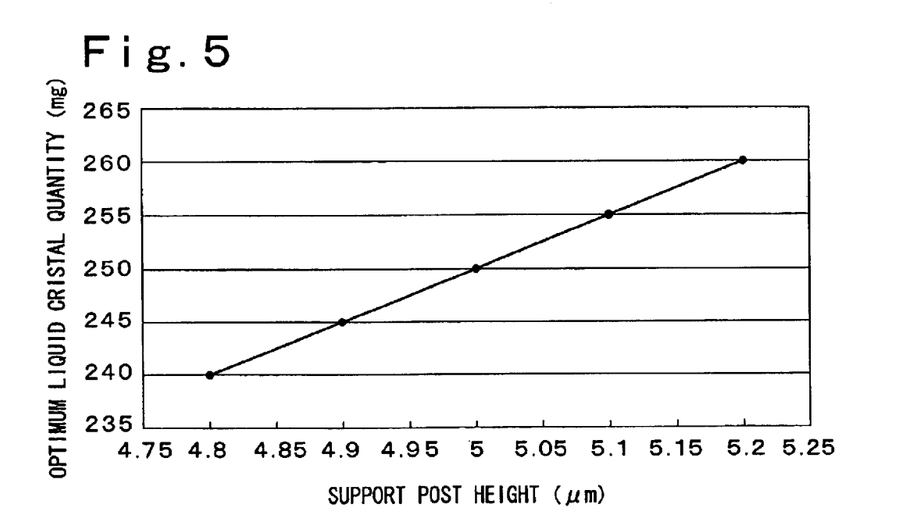
FIG. 5 is a graph showing the relationship between the height of support posts and an optimum quantity of liquid crystals.

FIG. 5 shows the relationship between the post height of columnar spacers of the liquid crystal display panel and the optimum quantity of liquid crystals. In FIG. 5, post heights (µm) are shown on the abscissa axis, and optimum quantities of liquid crystals (mg) are shown on the ordinate axis. As shown in FIG. 5, variation of the post height within a range of ±0.2 µm from 5 µm results in variation of the optimum quantity of liquid crystals within a range of ±10 mg from 250 mg.

As apparent from a comparison with FIG. 4, in the case of a 15 inch panel, an optimum range of the dispensing quantity is achieved when the post height is within a range of ±0.1 µm from 5 µm if the cell thickness is 5 µm. In practice, variation of the post height stays substantially within the range of ±0.1µm in the same production lot. However, variation of ±0.2 µm can occur between production lots for which film forming conditions are different. Further, in the case of multi-shot for forming a plurality of panels from a single glass substrate, variation of the post height of columnar spacers formed in each panel forming region on the glass substrate on the order of ±0.1 µm can occur between panel forming regions on the glass substrate.

Figure 6:
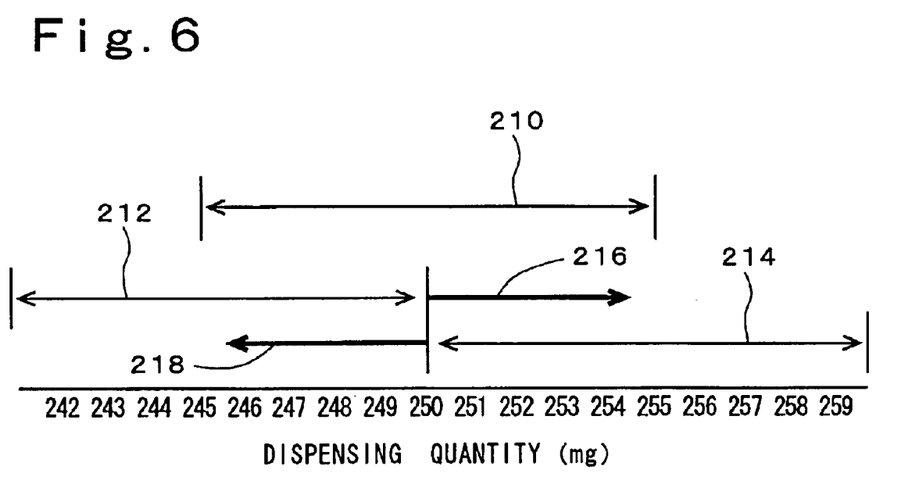
FIG. 6 is a graph showing ranges of an optimum quantity of liquid crystals relative to the heights of a variety of support posts.

For example, the optimum dispensing quantity can range as shown in FIG. 6 relative to the variation of the post height. Dispensing quantities (mg) are shown on the abscissa axis of FIG. 6. In FIG. 6, an optimum dispensing range 210 in the case of a support post height of 5 µm is from 245 mg to 255 mg. This is the same as the range 200 of the optimum dispensing quantity shown in FIG. 4. An optimum dispensing range 212 in the case of a support post height of 4.9 µm is from 240 mg to 250 mg. An optimum dispensing range 214 in the case of a support post height of 5.1 µm is from 250 mg to 260 mg.

The following problem occurs if the height of support posts of a substrate on which liquid crystals are actually dispensed is 4.9 µm or 5.1 µm as shown in FIG. 6 when the liquid crystal dispensing quantity is set for a support post height of 5 µm. Specifically, liquid crystals become redundant when liquid crystals in a range (indicated by the arrow 216) in the excess of 250 mg that is the maximum allowable dispensing quantity are dispensed on a substrate within the optimum dispensing range 212. Liquid crystals become insufficient when liquid crystals in a range (indicated by the arrow 218) which is short of 250 mg that is the minimum allowable dispensing quantity are dispensed on a substrate within the optimum dispensing range 214.

As thus described, a deviation of the dispensing quantity of 2.0% or more of the support post height results in a defect. In other words, a deviation of the support post height of 0.1 µm results in a deviation of 2% from a cell thickness of 5 µm. If the liquid crystal dispensing quantity is fixed on an assumption that the cell thickness is 5 µm, defective panels can be produced when the liquid crystal dispensing quantity varies due to other factors such as factors associated with the dispenser because there is no margin to absorb variation of the support post height from substrate to substrate.

Under such circumstances, according to the present embodiment, the support post height of columnar spacers is measured in advance at the dispense-injection step described using FIGS. 3A through 3C to allow the liquid crystal dispensing quantity to be controlled based on the measured value.

Figure 7:
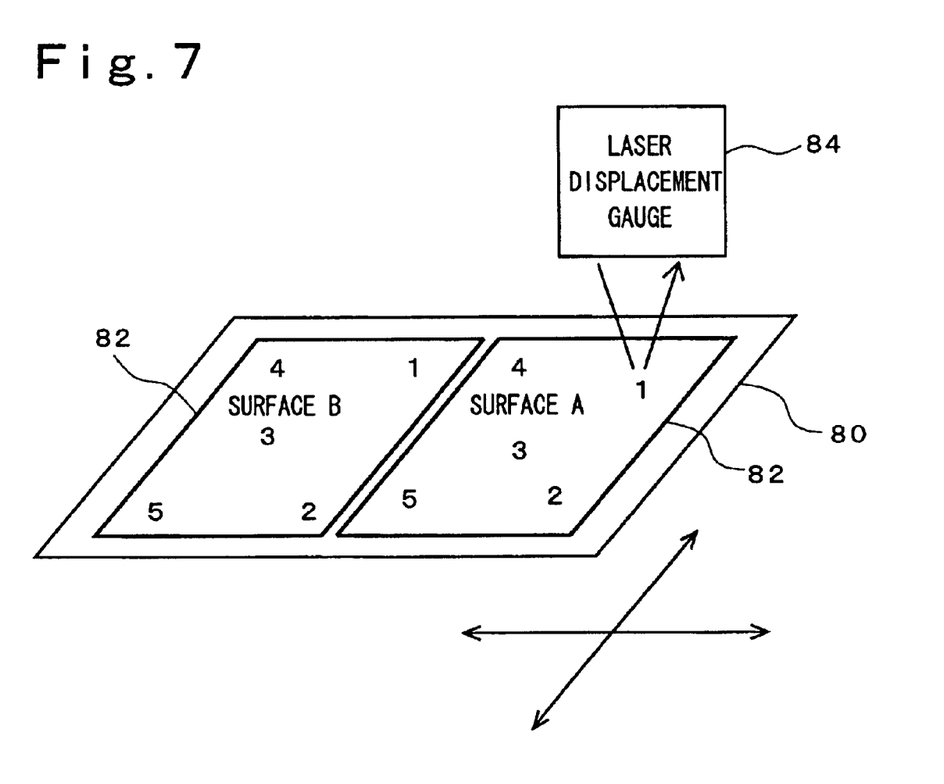
FIG. 7 is an illustration of the height measurement.

FIG. 7 shows an example of a method for measuring the support post height. FIG. 7 shows the case of a two-shot process at which two liquid crystal display panels 82 are fabricated from a single glass substrate 80. For example, let us assume that two CF substrates 82 having columnar spacers formed thereon are referred to as surfaces A and B respectively as illustrated. The heights of support posts at a plurality of points (five locations indicated by numerals 1 through 5 in the illustrated example) are measured on each of the surfaces A and B using a laser displacement gauge 84, and an average value is obtained. The surfaces of the CF substrates have already been subjected to a predetermined alignment process and the like.

Then, a UV sealing agent which also reacts with heat is applied to a TFT substrate which has been subjected to an alignment process. Then, the quantity of liquid crystals dispensed on the TFT substrate is controlled based on the height of the support posts on the CF substrates which has been measured in advance using the method shown in FIG. 7.

Figure 8:
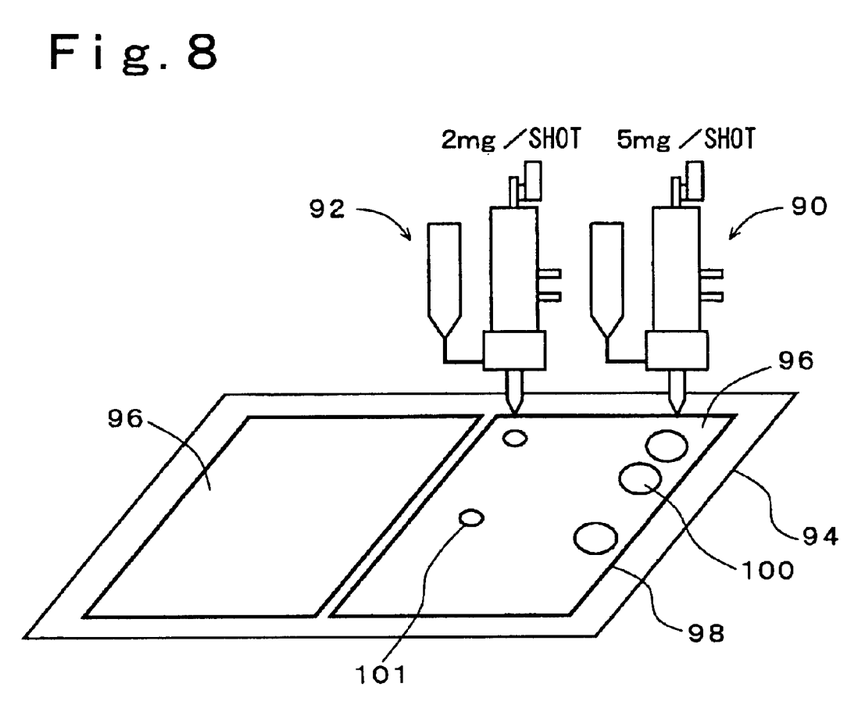
FIG. 8 is an illustration of control over the quantity of liquid crystals in the dispense-injection method used in the method for manufacturing a liquid crystal display according to the embodiment of the invention.

As shown in FIG. 8, two dispensers are prepared for dispensing liquid crystals. A dispenser 90 is the same as that shown in FIG. 2 and is adjusted to dispense 5 mg of liquid crystals per shot. Another dispenser 92 is identical to the dispenser 90 in the structure and is adjusted to dispense 2 mg of liquid crystals per shot through an adjustment of a micro-gauge 52.

As shown in FIG. 8, a glass substrate 94 from which TFT substrates are to be formed has a two-shot configuration to obtain two TFT substrates 96 similarly to the glass substrate 80 for forming CF substrates (see FIG. 7). A main seal 98 is formed in each region 82 where a TFT substrate is to be formed using a UV sealing agent which is applied to the periphery of the region in the form of a frame.

First, a predetermined quantity of liquid crystals 100 are dispensed on surfaces inside the frames of the UV sealing agent 98 where the TFT substrates 96 are to be formed using the dispenser 90 adjusted to dispense 5 mg per shot based on the average value of the heights of the columnar spacers provided on the CF substrates which has been measured in advance. The description will refer to the case of surfaces A and B having average support post heights of, for example 5 µm and 5.1 µm respectively in terms of dimensions measured on the completed CF substrates (on a sampling basis).

50 shots of liquid crystals are normally dispensed by the dispenser 90 onto a surface opposite to the surface A where a TFT substrate is to be formed, one shot being 5 mg. For example, the heights of the columnar spacers are measured on each substrate or on a sampling basis at predetermined intervals to conduct control such that liquid crystals are increased or decreased by one shot in response to an increase or decrease of 0.1 μm.

51 shots of liquid crystals are normally dispensed by the dispenser 90 onto a surface opposite to the surface B where a TFT substrate is to be formed, one shot being 5 mg. For example, the heights of the columnar spacers are measured on each substrate or on a sampling basis at predetermined intervals to conduct control such that liquid crystals are increased or decreased by one shot in response to an increase or decrease of 0.1 μm.

Since the dispensing quantity of the dispenser 90 varies ±1%, defects may occur unless the dispensing quantity is controlled such that it approaches the center of the optimum dispensing range for each support post height described with reference to FIG. 6 in order to dispense liquid crystals within the margin for the dispensing quantity. Further, problems may occur in fine adjustment because the set value for the dispensing quantity per shot is great. In such a case, liquid crystals 101 for adjustment are dispensed using the dispenser 92 which dispenses in a smaller quantity to achieve fine adjustment.

The glass substrates for which the dispensing quantity has been thus controlled are combined with each other in vacuum as described with reference to FIG. 3B. Since vacuum is maintained between the surfaces when they are exposed to the atmosphere, gap formation is completed by the differential pressure. Thereafter, a sealing agent 98 is irradiated with UV light to perform preliminary setting and is then thermally set in an oven. Predetermined positions of each surface of the two glass substrates thus combined are cut by means of scribing to obtain two liquid crystal display panels.

Since the number of shots of the dispensers is as large as 50, the total quantity of dispensed liquid crystals may vary. Therefore, it is possible to employ (1) a method in which a quantity of liquid crystals appropriate for the required total weight or volume is identified in advance and the total quantity of liquid crystals are dispensed thereafter or (2) a method in which the dispensing quantity is determined by monitoring an integrated amount of changes in the weight of liquid crystals dispensed by a dispenser on a panel placed on a gravimeter.

Figure 9:
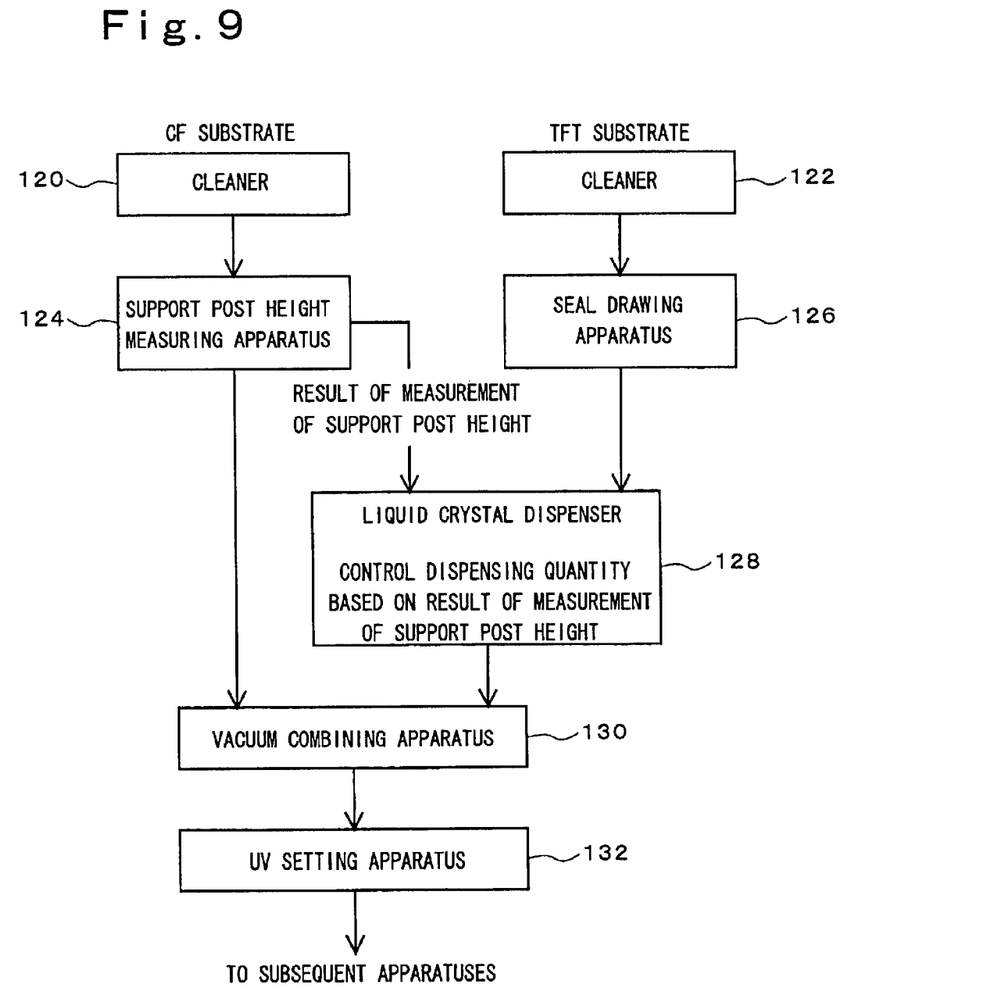
FIG. 9 is a diagram showing an example of a configuration of an in-line processing apparatus used in the method for manufacturing a liquid crystal display according to the embodiment of the invention.
Figure 10:
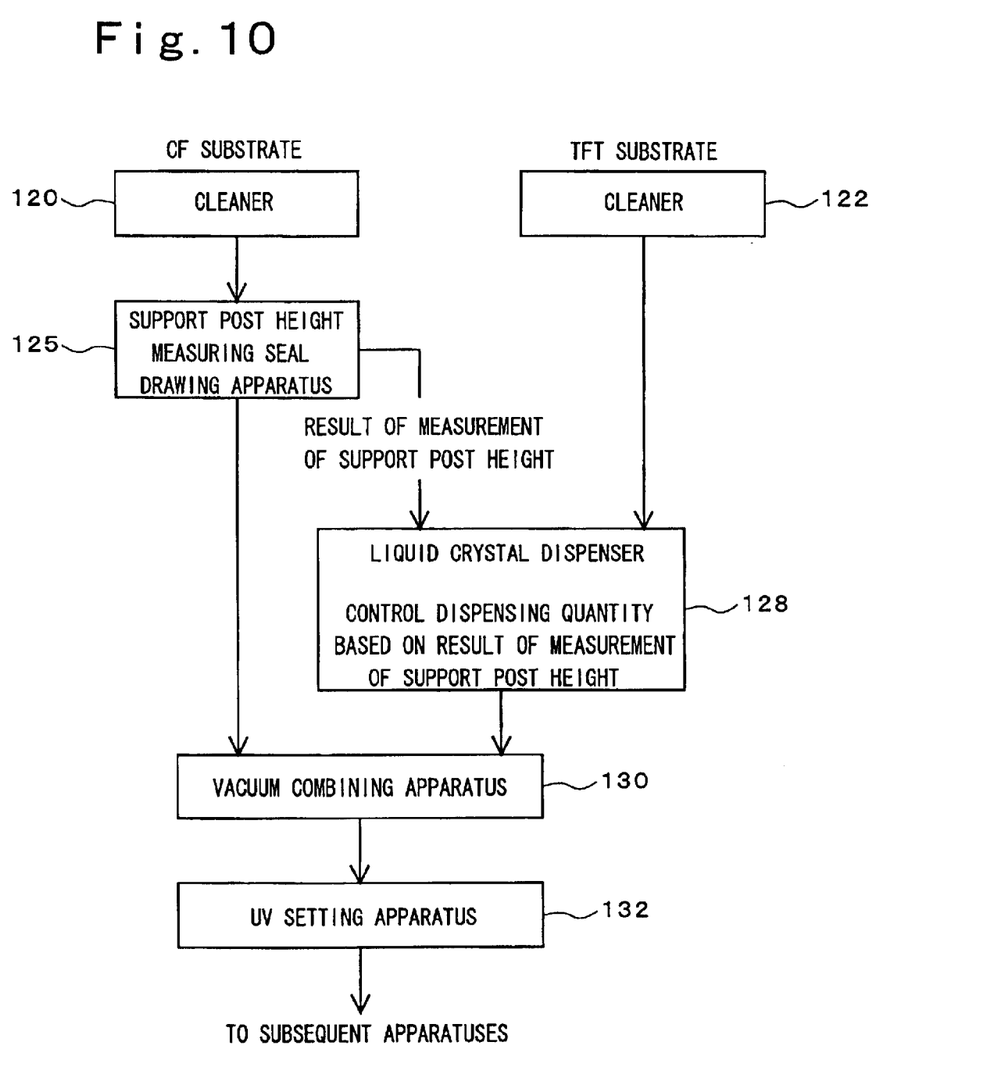
FIG. 10 is a diagram showing an example of another configuration of an in-line processing apparatus used in the method for manufacturing a liquid crystal display according to the embodiment of the invention.
Figure 11:
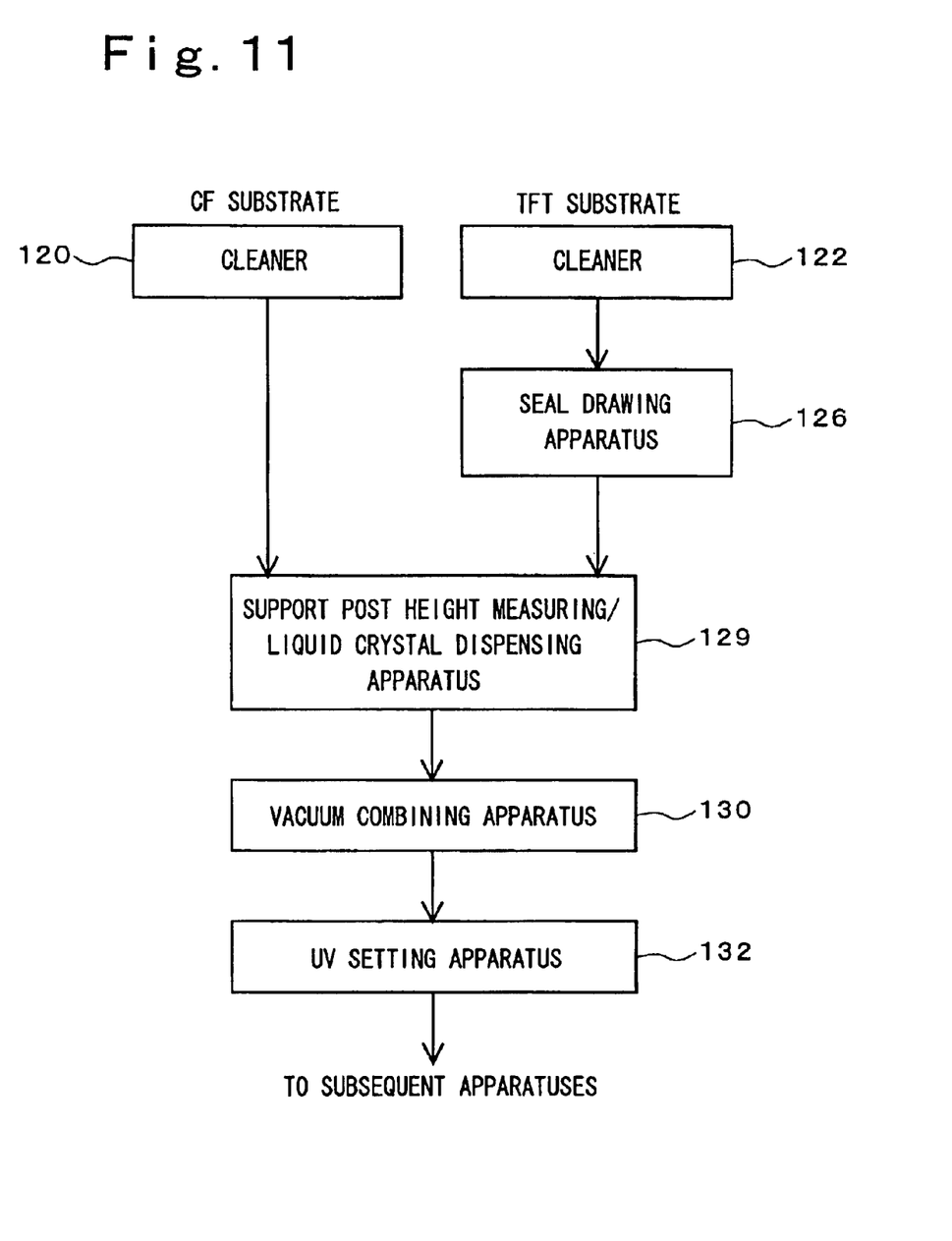
FIG. 11 is a diagram showing an example of still another configuration of an in-line processing apparatus used in the method for manufacturing a liquid crystal display according to the embodiment of the invention.

A description will now be made with reference to FIGS. 9 through 11 on an example of a configuration of an in-line processing apparatus used in the method for manufacturing a liquid crystal display according to the present embodiment. FIG. 9 shows an example of a configuration of the apparatus for performing measurement of support post heights and seal drawing concurrently.

Referring to FIG. 9, a CF substrate and a TFT substrate are transported into cleaners 120 and 122 respectively after being subjected to an alignment process. The cleaned CF substrate is transported to a post height measuring apparatus 124, and the cleaned TFT substrate is transported to a seal drawing apparatus 126.

The post height measuring apparatus 124 has a laser displacement gauge, for example. Support post heights at a plurality of points of columnar spacers formed on the CF substrate are measured, and an average value of the same is supplied to a liquid crystal dispenser 128 as a result of the measurement of support post heights. The seal drawing apparatus 126 has the same structure and functions as those of the dispenser shown in FIG. 2 and forms a main seal by drawing a UV sealing agent at the periphery of the TFT substrate in the form of a frame. The TFT substrate on which the main seal has been formed is transported to the liquid crystal dispenser 128.

The liquid crystal dispenser 128 has a dispenser as shown in FIG. 2 and dispenses a predetermined quantity of liquid crystals inside the main seal on the TFT substrate based on the result of measurement of the support post heights on the CF substrate. Then, the CF substrate and TFT substrate are transported to a vacuum combining apparatus 130 to be combined with a predetermined cell gap maintained between them and are transported to subsequent apparatuses after being subjected to a setting process at a UV setting apparatus 132.

A description will now be made with reference to FIG. 10 on an example of another configuration of the in-line processing apparatus used in the method for manufacturing a liquid crystal display according to the present embodiment. FIG. 10 shows an example of a configuration of the apparatus for performing measurement of support post heights and seal drawing on the same substrate substantially simultaneously. Referring to FIG. 10, a CF substrate which has been cleaned is transported to a support post height measuring/seal drawing apparatus 125 to perform the measurement of support post heights and seal drawing substantially simultaneously. Since the seal drawing is performed while monitoring irregularities of the substrate surface using a laser displacement gauge, the same laser displacement gauge is also used for the measurement of support post heights. Therefore, a TFT substrate which has been cleaned is placed in a liquid crystal dispenser 128 as it is without subjecting to the seal drawing process. In this case, seal drawing is performed on the CF substrate. With the configuration in FIG. 10, since there is no need for a seal drawing apparatus for the TFT substrate, the space occupied by the apparatuses can be reduced.

A description will now be made with reference to FIG. 11 on an example of still another configuration of the in-line processing apparatus used in the method for manufacturing a liquid crystal display according to the present embodiment. FIG. 11 shows an example of a configuration of the apparatus for performing measurement of support post heights and seal drawing substantially simultaneously. Referring to FIG. 11, a CF substrate which has been cleaned is transported to a support post height measuring/liquid crystal dispensing apparatus 129. A TFT substrate on which a seal has been drawn by a seal drawing apparatus 126 is also transported to the support post height measuring/liquid crystal dispensing apparatus 129.

In addition to a dispenser, the support post height measuring/liquid crystal dispensing apparatus 129 has a compact laser displacement gauge for measuring support post heights which is incorporated in an X-Y stage for dispensing liquid crystals. Therefore, the support post height measuring/liquid crystal dispensing apparatus 129 dispenses a predetermined quantity of liquid crystals on to a CF substrate or TFT substrate based on measured values of the support post heights of columnar spacers on the CF substrate. The configuration in FIG. 11 also makes it possible to reduce the space occupied by the apparatuses significantly.

The quantity of liquid crystals in a liquid crystal panel fabricated through the above-described steps is determined in accordance with the support post heights. Since this completely eliminates the so-called foams attributable to a shortage of liquid crystals and gap defects attributable to excessive liquid crystals, quite stable display quality can be maintained. While it has conventionally been considered that CF substrates manufactured on different days result in defects when they are put in the same processing flow, the present embodiment not only eliminates such a limitation but also makes it possible to absorb any variation of the optimum dispensing quantity in the same production lot and any variation of the optimum dispensing quantity in the surface of a glass substrate for the multi-shot process. This facilitates mass production of liquid crystal displays using the dispense-injection method.

The present invention is not limited to the above-described embodiment, and various modifications are possible.

For example, while columnar spacers are provided on a CF substrate in the above-described embodiment, this is not limiting the invention and they may be provided on a TFT substrate or on both of a CF substrate and TFT substrate.

While the description has referred to an example in which a cell thickness is maintained using spacers, the present invention is not limited thereto and may be applied to a method in which beads are dispersed on either of the substrates to maintain a cell thickness. When beads are dispersed, the dispersing density of the beads which has been measured for other purposes may be fed back to control over the dispensing quantity to dispense a predetermined quantity of liquid crystals based on the dispersing density, which makes it possible to achieve the same effect as those of the above-described embodiment.

As described above, the present invention makes it possible to dispense an optimum quantity of liquid crystals on to each liquid crystal panel, and it is therefore possible to perform stable mass production by eliminating gap defects attributable to the so-called foams and excessive liquid crystals. The present invention therefore makes it possible to achieve production yield similar to that of the existing vacuum injection processes while reducing defects attributable to a dispense-injection process. It is also possible to achieve a cost reduction through simplification of manufacturing steps through the use of the dispense-injection method.

What is claimed is:

1. A method for manufacturing a liquid crystal display, the method comprising the steps of:

measuring a height of a columnar spacer formed on one of two substrates;

dispensing liquid crystals on at least one or the other substrate with an optimum quantity decided by a measured height of the spacer based on a predetermined relationship between a quantity to be dispensed and the height of the spacer;

combining the one substrate with the other substrate in a vacuum with a liquid crystal dispensing surface facing an opposite substrate surface; and restoring an atmospheric pressure after the combining step.

2. A method for manufacturing a liquid crystal display according to claim 1, wherein the optimum quantity of dispensed liquid crystals is controlled by adjusting a quantity per shot.

3. A method for manufacturing a liquid crystal display according to claim 1, wherein the optimum quantity of dispensed liquid crystals is controlled by varying a number of shots of liquid crystal.

4. A method for manufacturing a liquid crystal display according to claim 1, wherein the decision of the optimum quantity of liquids crystals is carried out for each region where a panel is to be formed in the case of a multi-shot substrate.

5. A method for manufacturing a liquid crystal display, the method comprising the steps of;

measuring a dispersing density of spherical particles dispersed on one of two substrates;

dispensing liquid crystals on at least one or the other substrate with an optimum quantity decided by a measured density of spherical particles based on a predetermined relationship between a quantity to be dispensed and the density of the spherical particles;

combining the one substrate with the other substrate in a vacuum with a liquid crystal dispensing surface facing an opposite substrate surface; and restoring an atmospheric pressure after the combining step.

6. A method for manufacturing a liquid crystal display according to claim 5, wherein the optimum quantity of dispensed liquid crystals is controlled by adjusting a quantity per shot.

7. A method for manufacturing a liquid crystal display according to claim 5, wherein the optimum quantity of dispensed liquid crystals controlled by varying a number of shots of liquid crystal.

8. A method for manufacturing a liquid crystal display according to claim 5, wherein the decision of the optimum quantity of liquid crystals is carried out for each region where a panel is to be formed in the case of a multi-shot substrate.

* * * * *